United States Patent [19]
Charlier

[11] Patent Number: 5,153,590
[45] Date of Patent: Oct. 6, 1992

[54] KEYPAD APPARATUS

[75] Inventor: Michael L. Charlier, Arlington Heights, Ill.

[73] Assignee: Motorola, Inc., Schaumburg, Ill.

[21] Appl. No.: 650,151

[22] Filed: Feb. 4, 1991

[51] Int. Cl.$^5$ .................. H01H 13/70; H01H 9/18
[52] U.S. Cl. ........................ 341/31; 341/22; 362/31; 200/317
[58] Field of Search .............. 341/31, 22, 23; 200/5 A, 47, 310, 313, 317, DIG. 36; 40/546, 547; 362/26, 31, 24; 379/368, 396

[56] References Cited

U.S. PATENT DOCUMENTS

| | | |
|---|---|---|
| 3,669,294 | 10/1972 | Sudduth . |
| 3,892,959 | 7/1975 | Pules . |
| 4,015,254 | 3/1977 | Strandt .................................. 341/22 |
| 4,022,993 | 5/1977 | Shattuck . |
| 4,096,550 | 6/1978 | Boller et al. . |
| 4,124,879 | 11/1978 | Schoemer . |
| 4,163,138 | 7/1979 | Harden . |
| 4,163,883 | 8/1979 | Boulanger . |
| 4,271,333 | 6/1981 | Adams et al. . |
| 4,317,011 | 2/1982 | Mazurk . |
| 4,323,740 | 4/1982 | Balash . |
| 4,328,399 | 5/1982 | Perks .................... 379/368 |
| 4,343,975 | 8/1982 | Sado . |
| 4,449,024 | 5/1984 | Stracener . |
| 4,491,692 | 1/1985 | Lee . |
| 4,499,343 | 2/1985 | Prioux et al. . |
| 4,536,625 | 8/1985 | Bebie . |
| 4,573,766 | 3/1986 | Boumay, Jr. et al. . |
| 4,719,322 | 1/1988 | Guzik et al. . |
| 4,729,067 | 3/1988 | Ohe . |
| 4,897,651 | 1/1990 | DeMonte ...................... 341/23 |
| 5,053,928 | 10/1991 | Pasco .................... 362/31 |

FOREIGN PATENT DOCUMENTS 1496640 10/1976 United Kingdom .

OTHER PUBLICATIONS

Design News, Sep. 18, 1988, pp. 146-147, *3-D Circuit Boards Optimize Use of Space,* this article describes the use of conductive ink for use in circuits.

Design News, Technology Focus, Apr. 23, 1990, pp. 56-58, *Conductive Adhesives Do Double Duty,* this article describes the use of conductive adhesives for use in circuits.

Micro Touch Systems, Inc, Woburn, Mass., *Touch Screens Diversity,* by James D. Logan, Nov. 1, 1985, this article discusses the use of resistive networks to detect touching of a screen.

EDN, Oct. 16, 1986, pp. 195-202, *Touchscreen Displays Suit Multifarious Applications,* This article discusses the use of resistive networks to detect touching of a screen.

*Primary Examiner*—Donald J. Yusko
*Assistant Examiner*—Michael Krakovsky
*Attorney, Agent, or Firm*—Kirk W. Dailey; Robert H. Kelly

[57] ABSTRACT

A keypad apparatus for a radio telephone has the keypad circuit (200) inked onto the lightpipe (105), thereby, allowing freedom in designing the shape of the keypad (103) and reducing the amount of circuitry required on the main circuit board (109) contained within the housing (107) of the radiotelephone.

23 Claims, 3 Drawing Sheets

FIG. 4
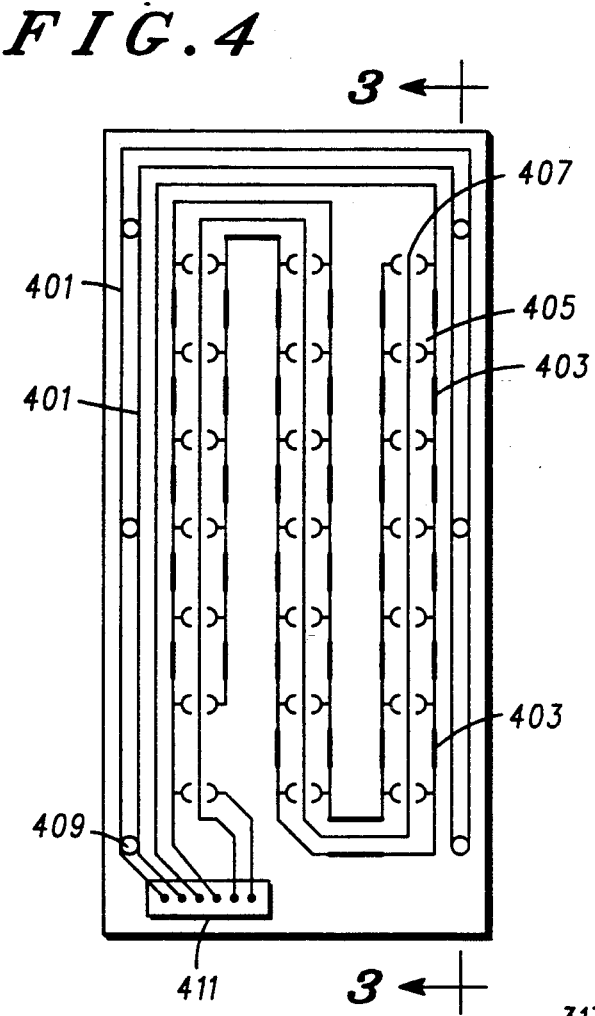
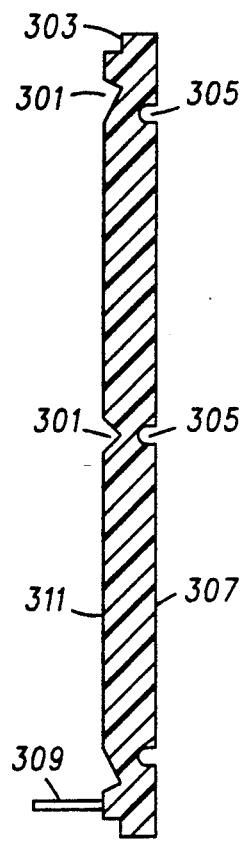
FIG. 3A
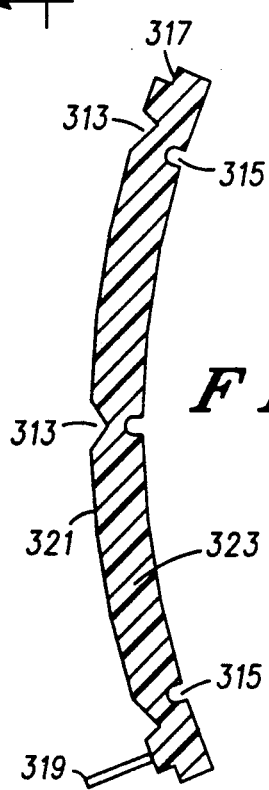
FIG. 3B

KEYPAD APPARATUS

FIELD OF THE INVENTION

This invention generally relates to keypads and more specifically to a keypad employing resistive and conductive inks applied to one surface of a lightpipe for use in back-lit keypads.

BACKGROUND OF THE INVENTION

Typically, there are two types of keypads used in radiotelephones. In the first type of keypad, the keys are directly attached to the circuit board internal to the radiotelephone. In the second type of keypad, the keypad is a separate entity from the circuit board contained within the radiotelephone. The keypad and the circuit board are coupled together via wires.

The keypad circuit is used in a keypad to detect activation of one or more keys. The typical circuit contains a multi-layer grid of wires. When a key is activated, the two wires corresponding to the row and column in which the key is located are electrically ground. Each wire is then polled to check for a grounded signal. From the results, the controller can determine which keys are activated.

As a reduction in size and flexibility of design in radiotelephones becomes more prominent, efficient use of space and unique shapes become more important. In the first type of keypad, the keypad utilizes a relatively large amount of space on the circuit board contained within the radiotelephone. Since the keypads interact directly with the circuit board, back-lighting each individual key is necessary because there is no use of reflective plates or light pipes, this increases the power consumption and makes the keypad more cumbersome.

In the second type of design, the keypad is separated from the circuit board internal to the radiotelephone except for the electrical coupling of the keypad circuitry to the circuit board. A keypad containing 24 keys requires approximately 13 wires plus the wiring for the back-lighting circuitry. This second type of keypad supports back-lighting with reflector plates and light pipes which reduces the number of LEDs necessary to backlight a keypad. This second type of keypad also supports the use of a new technology, the new technology of conductive/resistive ink, which allows circuits to be inked onto materials other than circuit boards themselves such as thermal plastics.

As the market for radiotelephones continues to become smaller and the use of portables and personal telephones increase, the shielding of the radio transmitter from radio frequency interference (RFI) and electromagnetic interference (EMI) becomes a more important issue. There are two sources of EMI and RFI noise caused by the preceding types of keypads. The first source is the polling by the keypad circuitry which enables the radiotelephone to determine if a key has been activated. The second source of noise comes from the holes in the keypad which reduce the shielding on the radio transmitter contained within the radiotelephone. In the first keypad design the holes are for the keys themselves and in the second design there is a hole to run the wires which couple the keypad to the circuit board internal to the radiotelephone.

Although the two preceding designs have served the industry well to this point, the need exists for a keypad which is more efficient in the use of the circuit board internal to the radiotelephone, reduces the amount of RFI and EMI introduced by a radiotelephone and reduces the number of wires coupled between the keypad circuit and the circuit board internal to the radiotelephone.

SUMMARY OF THE INVENTION

The present invention encompasses a keypad apparatus which has a plurality of keys, a lightpipe having at least two sides and a coating disposed on a first side, reflecting light inside the lightpipe and an electrical circuit. The electrical circuit is disposed upon one side of the lightpipe and opposite the plurality of keys.

BRIEF DESCRIPTION OF THE DRAWINGS

FIG. 3A is an embodiment of a lightpipe assembly.

FIG. 3B is an alternate embodiment of a lightpipe assembly.

FIG. 4 is a lightpipe assembly including a keypad circuit inked onto its surface.

DESCRIPTION OF A PREFERRED EMBODIMENT

Figure 1:
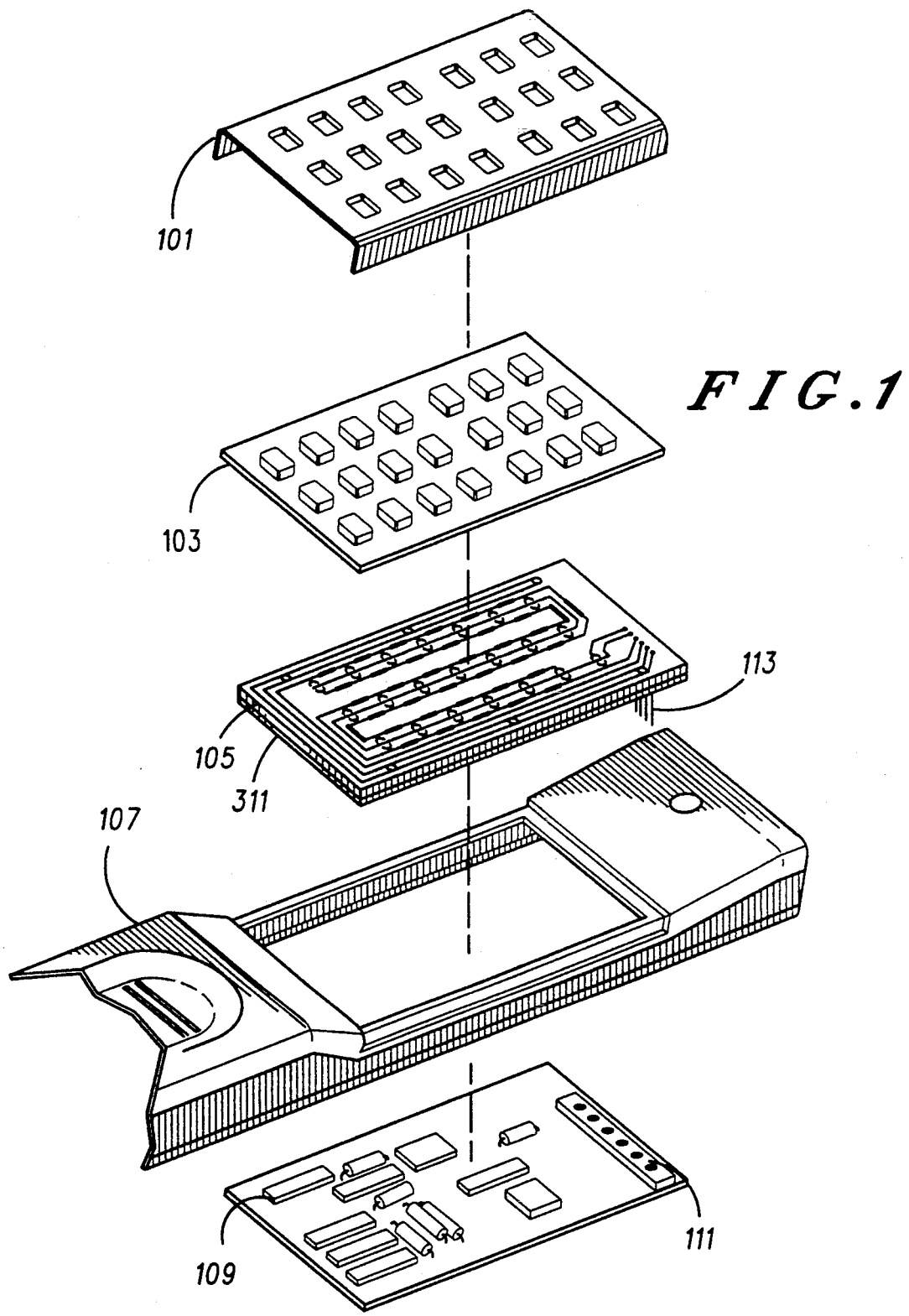
FIG. 1 is a exploded view of a keypad assembly coupled to a radiotelephone.
Figure 2:
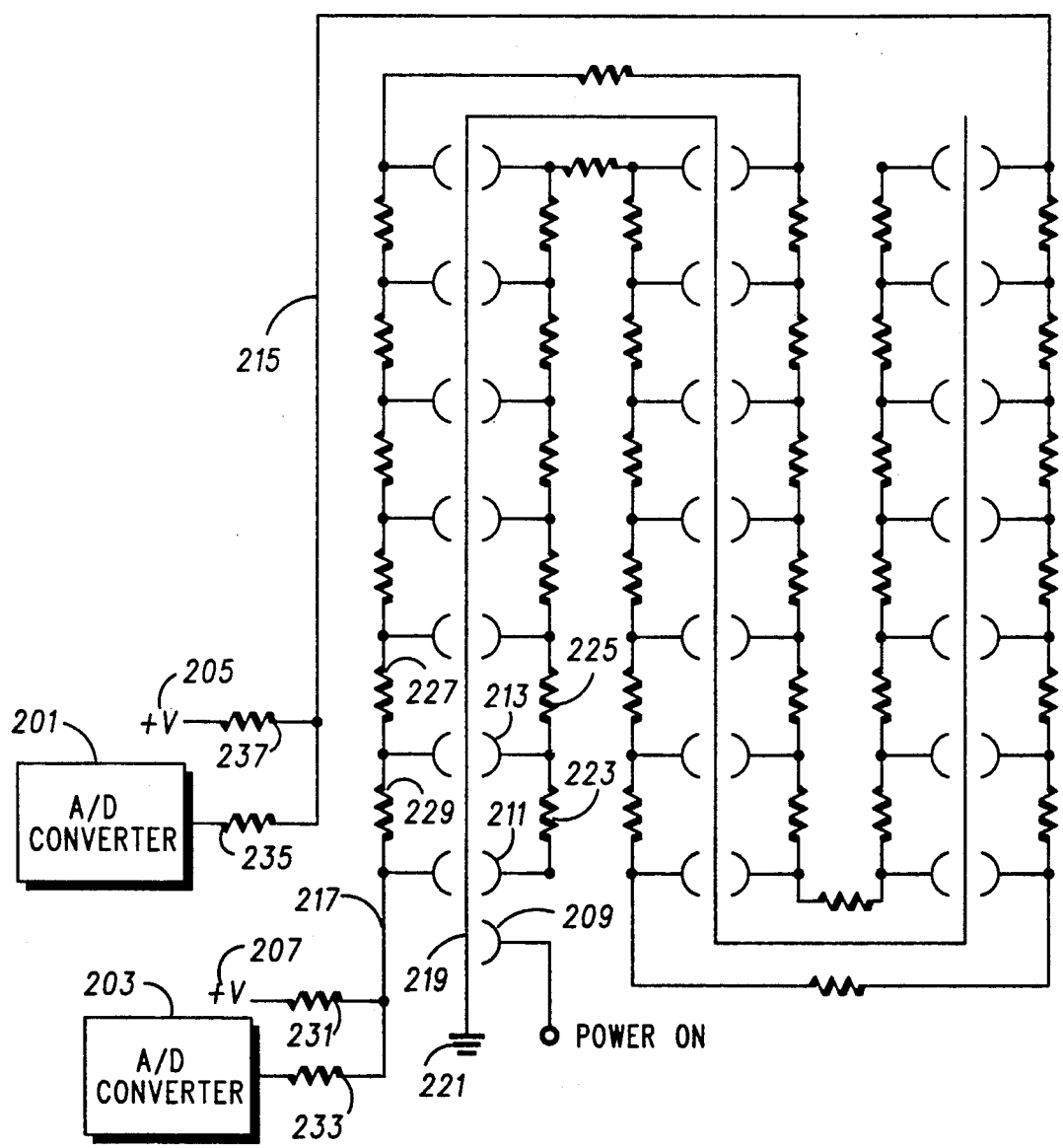
FIG. 2 is a keypad circuit used to detect activation of keys within a keypad.

A back-lit keypad assembly is shown in FIG. 1. Here, the light pipe assembly 105 is sonically welded to the housing 107. The lightpipe assembly also contains the keypad circuit which is illustrated in FIG. 2. The circuit board 109 and the light pipe assembly 105 are coupled together when the six pins 113 are inserted into the six pin receptacles 111 located on the circuit board 109. The keypad 103 lays on top of the lightpipe assembly 103 and the bezel 101 secures the keypad 103 to the lightpipe assembly 105.

FIG. 2 reveals the keypad circuit used for this back-lit keypad apparatus illustrated in FIG. 1. The keypad circuit is used to detect keypad operation with a minimized number of wires. For a twenty-four key keypad this circuit requires less than half the wires of the conventional keypad circuit as discussed in the background of the invention.

The keypad circuit consists of 3 conductive wires 215, 217, 219, the first conductive wire 219 is a common ground which runs beneath each key 211, 213 of the keypad, the second and third wires 215, 217 contain resistors 227, 229, 223, 225 between each of the keys 211, 213, a resistor $R_S$ 231, 237 between the supply voltage 207, 205 and the wires 217, 215 and a current limiting resistor 233, 235 between the A/D converter 203, 201 and the wires 217, 215.

Upon activation of one of the keys, a conductive strip on the key shorts the two wires to a common ground, forming a voltage at the A/D converter corresponding to a given key, the voltage corresponding to the following equation:

$$V_{A/D} = V_S \left[ \frac{R_{EQ}}{R_S + R_{EQ}} \right]$$

Where $V_{A/D}$ is the voltage at the analog to digital converters (A/D) 201, 203, $V_S$ is the source voltage for the circuit, $R_S$ is the resistor 231, 237 in series with $V_S$ and $R_{EQ}$ is the sum of the resistors 229, 227 which are connected together in series between each key 211, 213.

Together $V_S$ and $R_S$ form what is referred to as the power supply. The two resistive networks 215, 217 are necessary to detect if two keys are activated at once, or in the case of one resistive network failing the other network will remain operational. The two resistive networks 215, 217 are wired to the keys in opposite directions, therefore, when one key is pushed a corresponding voltage results at the first A/D converter 201 and a different corresponding voltage results at the second A/D converter 203. If a second key has been pushed before the first key is released, the voltage on one of the A/D converters 201, 203 will change to represent the second key. This is used in cases of two key roll-over during normal operation of the phone and also for two-key programming of the advanced features in a radiotelephone. In the case that one of the resistive networks fail, the radiotelephone remains operational for single-key programming.

The circuit revealed in FIG. 2, can be applied to a standard circuit board or it can be inked onto a plastic housing or a lightpipe as shown in FIG. 4. The use of printed conductive inks and resistive inks adds flexibility to the designing of this keypad. In this embodiment, the circuit is inked onto the light pipe assembly 105. This allows the keypad assembly to be flexible in design and it frees up additional room on the circuit board 109 contained within the radio housing so that additional circuits may be added to the circuit board 109 or the overall size of the circuit board 109 may be reduced. The keypad circuit 200 is coupled to the circuit board internal to the radiotelephone housing 109 using the 6 connectors 411 which interlink with the 6 connector receptacles 111 located on the circuit board 109.

FIG. 3A reveals the side view of the light pipe assembly 105 in its first embodiment. The light pipe assembly is a clear plastic housing containing 6 connector pins 309. The backside, the side which would face the internal contents of the housing 107, is coated with an EMI/RFI shield 311 to reduce the amount of noise which escapes from the radiotelephone. The only holes in the EMI/RFI shield are from the six connector pins 309 which are insert molded into the lightpipe assembly. The reduction of the holes in the EMI/RFI shield becomes very important as the requirements for EMI and RFI become more stringent in the future. The other side of the EMI/RFI shield 311, which is on the backside of the light pipe assembly 105, serves as a reflective material for distributing the light from the LEDs evenly beneath the keypad assembly 103. The light pipe assembly 105 also contains three molded detents 305 to hold LEDs for back-lighting. These are placed within the surface of the lightpipe assembly which contains the keypad circuit. The detents 305 allow the transmission light of the LEDs to be inserted into the light pipe assembly 105. The backside of the light pipe assembly 105 contains molded-in light reflector ramps 301 which assist in distributing the light emitted by the LEDs evenly. They are opposite the detents 305. There are ledges 303 on the top and bottom side of the lightpipe assembly 105 for purposes of ultrasonically welding the lightpipe assembly 105 to the housing of the radiotelephone 107.

FIG. 3B reveals an alternative embodiment of the light pipe assembly 105. In this embodiment the keypad circuit 200 is inked onto the curved surface of the lightpipe assembly 105 where the radius of curvature of the lightpipe is not less than 3 centimeters. The features of the lightpipe assembly 105 are identical to those revealed in 3A. Again, the backside of the light pipe assembly 105 is coated with an EMI/RFI shield 321 which also serves as a reflector from the front side of the light pipe assembly 105. The light pipe assembly 105 also contains 3 molded detents to hold LEDs for back-lighting purposes. The detents allow the transmission of the light emitted from the LEDs into the light pipe. This embodiment also contains molded-in light reflector ramps 313 which assist in distributing the light emitted from the LEDs evenly throughout the back of the keypad 103. A ledge 317 on both the upper and lower sides of the light pipe assembly allow the light pipe to be ultrasonically welded to the housing of the radiotelephone 107 giving good support and weather resistance to the sensitive electronics contained within the housing 107. This design offers several advantages over the standard keypad available today. It reduces the amount of space on the circuit board, it improves EMI/RFI protection, it reduces the pin count, and it allows design flexibility, such as curved keypads or any shape of keypads that one desires.

What is claimed is:

1. A keypad apparatus containing a plurality of keys, the keypad apparatus comprising:
    a lightpipe having at least two sides and a coating disposed upon a first side of said lightpipe reflecting light inside said lightpipe; and
    an electrical keypad circuit disposed upon a second side of said lightpipe and the plurality of keys disposed upon a portion of said electrical keypad circuit and said second side of said lightpipe.

2. A keypad apparatus in accordance with claim 1 wherein said electrical circuit further comprises conductive and resistive ink printed upon said second side of said lightpipe.

3. A keypad apparatus in accordance with claim 1 wherein said keypad apparatus further comprises:
    at least one detent molded into said second side of said lightpipe;
    at least one light reflector ramp molded into said first side of said lightpipe opposite said at least one detent; and
    at least one light source disposed within said at least one detent and coupled to said electrical circuit.

4. A keypad apparatus in accordance with claim 1 wherein said electrical circuit further comprises:
    a first plurality of resistors disposed upon said lightpipe;
    a first conductive trace disposed upon said lightpipe, coupling together said first plurality of resistors and having a first end;
    a first power supply including a voltage source having at least one output and a resistor having a first and a second end, said first end of said resistor coupled to one of said at least one output and said second end coupled to said first end of said first conductive trace;
    a second conductive trace coupled to an electrical ground;
    means, responsive to the activation of a first of the plurality of keys, for coupling said first trace to said second trace and attaining a first voltage level at said first end of said first trace; and
    means, responsive to the activation of a second of the plurality of keys, for coupling said first trace to said second trace and attaining a second voltage level at said first end of said first trace.

5. A keypad apparatus in accordance with claim 4 further comprising a first digital to analog converter coupled to said first end of said first trace.

6. A keypad apparatus in accordance with claim 4 wherein the electrical circuit further comprises:
- a second plurality of resistors disposed upon said lightpipe;
- a third conductive trace disposed upon said lightpipe, coupling together said second plurality of resistors and having a first end;
- a second power supply including a voltage source having at least one output and a resistor having a first and a second end, said first end of said resistor coupled to one of said at least one output and said second end coupled to said first end of said third conductive trace;
- means, responsive to the activation of said first of the plurality of keys, for coupling said third trace to said second trace and attaining a third voltage level at said first end of said third trace;
- means, responsive to the activation of said second of the plurality of keys, for coupling said third trace to said second trace and attaining a fourth voltage level at said first end of said first trace; and
- means, responsive to the activation of said first and said second of the plurality of keys, for coupling said first trace to said second trace to said third trace and obtaining a fifth and a sixth voltage level, wherein said fifth and said sixth voltage levels are of unequal voltage levels.

7. A keypad apparatus in accordance with claim 1 further comprising a bezel coupled to said lightpipe securing the plurality of keys opposite said second surface of said lightpipe.

8. A keypad apparatus in accordance with claim 1 wherein said lightpipe forms a rectangular prismatic solid.

9. A keypad apparatus in accordance with claim 8 wherein said lightpipe has a radius of curvature along said first and said second side not less than 3 centimeters.

10. A keypad apparatus in accordance with claim 6 further comprising a second digital to analog converter coupled to said first end of said third trace.

11. A radiotelephone in a system which allows the radiotelephone to initialize phone calls, the radiotelephone comprising:
- a circuit board disposed within a housing of the radiotelephone;
- a lightpipe having at least two sides and secured to said housing;
- a coating disposed upon a first side of said lightpipe reflecting light inside said lightpipe and shielding electromagnetic and radio frequency interference;
- a plurality of keys forming a keypad, such that phone calls may be initialized;
- an electrical keypad circuit disposed upon a second side of said lightpipe, said plurality of keys disposed upon a portion of said electrical keypad circuit and said second side of said lightpipe, and said electrical keypad circuit coupled to said circuit board; and
- a keypad bezel mechanically coupled to said housing and securing said plurality of keys between said lightpipe and said bezel.

12. A radiotelephone in accordance with claim 11 wherein said electrical circuit further comprises conductive and resistive ink printed upon said second side of said lightpipe.

13. A radiotelephone in accordance with claim 11 further comprising:
- at least one detent molded into said second side of said lightpipe;
- at least one light reflector ramp molded into said first side of said lightpipe opposite said at least one detent; and
- at least one light source disposed within said at least one detent and coupled to said electrical circuit.

14. A radiotelephone in accordance with claim 11 wherein said electrical circuit further comprises:
- a first plurality of resistors disposed upon said lightpipe;
- a first conductive trace disposed upon said lightpipe, coupling together said first plurality of resistors and having a first end;
- a first power supply including a voltage source having at least one output and a resistor having a first and a second end, said first end of said resistor coupled to one of said at least one output and said second end coupled to said first end of said first conductive trace;
- a second conductive trace coupled to an electrical ground;
- means, responsive to the activation of a first of the plurality of keys, for coupling said first trace to said second trace and attaining a first voltage level at said first end of said first trace; and
- means, responsive to the activation of a second of the plurality of keys, for coupling said first trace to said second trace and attaining a second voltage level at said first end of said first trace.

15. A radiotelephone in accordance with claim 14 further comprising a first digital to analog converter coupled to said first end of said first trace.

16. A keypad apparatus in accordance with claim 14 wherein the electrical circuit further comprises:
- a second plurality of resistors disposed upon said lightpipe;
- a third conductive trace disposed upon said lightpipe, coupling together said second plurality of resistors and having a first end;
- a second power supply including a voltage source having at least one output and a resistor having a first and a second end, said first end of said resistor coupled to one of said at least one output and said second end coupled to said first end of said third conductive trace;
- means, responsive to the activation of said first of the plurality of keys, for coupling said third trace to said second trace and attaining a third voltage level at said first end of said third trace;
- means, responsive to the activation of said second of the plurality of keys, for coupling said third trace to said second trace and attaining a fourth voltage level at said first end of said first trace; and
- means, responsive to the activation of said first and said second of the plurality of keys, for coupling said first trace to said second trace to said third trace and obtaining a fifth and a sixth voltage level, wherein said fifth and said sixth voltage levels are of unequal voltage levels.

17. A keypad apparatus in accordance with claim 11 wherein said lightpipe forms a rectangular prismatic solid.

18. A keypad apparatus in accordance with claim 17 wherein the keypad apparatus has a radius of curvature along said first and said second sides not less than 3 centimeters.

19. A radiotelephone in accordance with claim 16 further comprising a second digital to analog converter coupled to said first end of said third trace.

20. A keypad circuit for use in a keypad apparatus, the keypad circuit further comprising:
- a lightpipe in the keypad apparatus;
- a first conductive trace having a first end and coupled to a first side of said lightpipe;
- a first plurality of resistors coupled electrically in series with said first conductive trace and coupled to said first side of said lightpipe;
- a first power supply including a voltage source having at least one output and a resistor having a first and a second end, said first end of said resistor coupled to one of said at least one output and said second end coupled to said first end of said first conductive trace;
- a second conductive trace coupled to an electrical ground and said first side of said lightpipe;
- means, responsive to the activation of a first of a plurality of keys, for coupling said first trace to said second trace and attaining a first voltage level at said first end of said first trace; and
- means, responsive to the activation of a second of said plurality of keys, for coupling said first trace to said second trace and attaining a second voltage level at said first end of said first trace.

21. A keypad circuit in accordance with claim 20 further comprising a first digital to analog converter coupled to said first end of said first trace.

22. A keypad circuit in accordance with claim 20 further comprising:
- a third conductive trace having a first end and coupled to said first side of said lightpipe;
- a second plurality of resistors coupled electrically in series with said third conductive trace and coupled to said first side of said lightpipe;
- a second power supply including a voltage source having at least one output and a resistor having a first and a second end, said first end of said resistor coupled to one of said at least one output and said second end coupled to said first end of said third conductive trace;
- means, responsive to the activation of said first of the plurality of keys, for coupling said third trace to said second trace and attaining a third voltage level at said first end of said third trace;
- means, responsive to the activation of said second of the plurality of keys, for coupling said third trace to said second trace and attaining a fourth voltage level at said first end of said first trace; and
- means, responsive to the activation of said first and said second of the plurality of keys, for coupling said first trace to said second trace to said third trace and obtaining a fifth and a sixth voltage level, wherein said fifth and said sixth voltage levels are of unequal voltage levels.

23. A keypad circuit in accordance with claim 20 wherein said keypad circuit further comprises conductive and resistive ink.

* * * * *